United States Patent [19]

Richard

[11] Patent Number: 4,503,158

[45] Date of Patent: Mar. 5, 1985

[54] DOUBLE OR MIXED SILICATES OF ALKALI METAL AND OTHER GLASS MODIFIER METAL(S) USED TO PREPARE GLASS COMPOSITIONS

[75] Inventor: Christian Richard, Clamecy, France

[73] Assignee: Rhone-Poulenc Industries, Paris, France

[21] Appl. No.: 484,581

[22] Filed: Apr. 13, 1983

Related U.S. Application Data

[63] Continuation-in-part of Ser. No. 281,913, Jul. 9, 1981, abandoned.

[30] Foreign Application Priority Data

Jul. 11, 1980 [FR] France ............................ 80 15460
Feb. 11, 1981 [FR] France ............................ 81 02640

[51] Int. Cl.$^3$ ............................................. C03C 1/00
[52] U.S. Cl. ............................. 501/27; 65/134; 423/326; 423/331; 423/333; 501/29; 501/30; 501/31; 501/60; 501/65
[58] Field of Search ............ 423/326, 333, 331; 501/27, 29, 30, 31; 65/134; 106/74

[56] References Cited

U.S. PATENT DOCUMENTS

| | | | |
|---|---|---|---|
| 2,386,337 | 10/1945 | Moyer | 423/335 |
| 4,021,253 | 5/1977 | Budrick et al. | 501/27 |
| 4,029,736 | 6/1977 | Melkonian | 423/333 |
| 4,054,459 | 10/1977 | Melkonian | 501/29 |
| 4,063,916 | 12/1977 | DeVos et al. | 501/65 |
| 4,220,461 | 9/1980 | Samanta | 501/11 |

FOREIGN PATENT DOCUMENTS

| | | | |
|---|---|---|---|
| 0044236 | 1/1982 | European Pat. Off. | 423/331 |
| 3006534 | 8/1980 | Fed. Rep. of Germany | 423/326 |
| 2504110 | 10/1982 | France | 423/326 |
| 383126 | 11/1932 | United Kingdom | 501/60 |
| 848296 | 9/1960 | United Kingdom | 501/37 |
| WO78/00001 | 1/1978 | PCT Int'l Appl. | |

OTHER PUBLICATIONS

Richard, C., "New Composition Based on Head Silicate and Alkaline Silicates" Verres Refract, 33(6) Nov.–Dec. 1979, pp. 864–865.

Kirk–Othmer: Encyclopedia of Chemical Technology, vol. 11, 3rd ed. (1980) p. 826; pp. 849–851.

*Primary Examiner*—Helen M. McCarthy
*Attorney, Agent, or Firm*—Burns, Doane, Swecker & Mathis

[57] ABSTRACT

An at least double silicate of an alkali metal and at least one other metal is prepared by interreacting (i) an aqueous solution of an alkali metal silicate and (ii) a solution of an oxide of such at least one other metal, or salt thereof, in the presence of (iii) a water-miscible polar organic liquid, whereby said at least double silicate is suspended in the organic reaction medium in insoluble and finely divided form. The separated product is an admirable glass-former.

15 Claims, 4 Drawing Figures

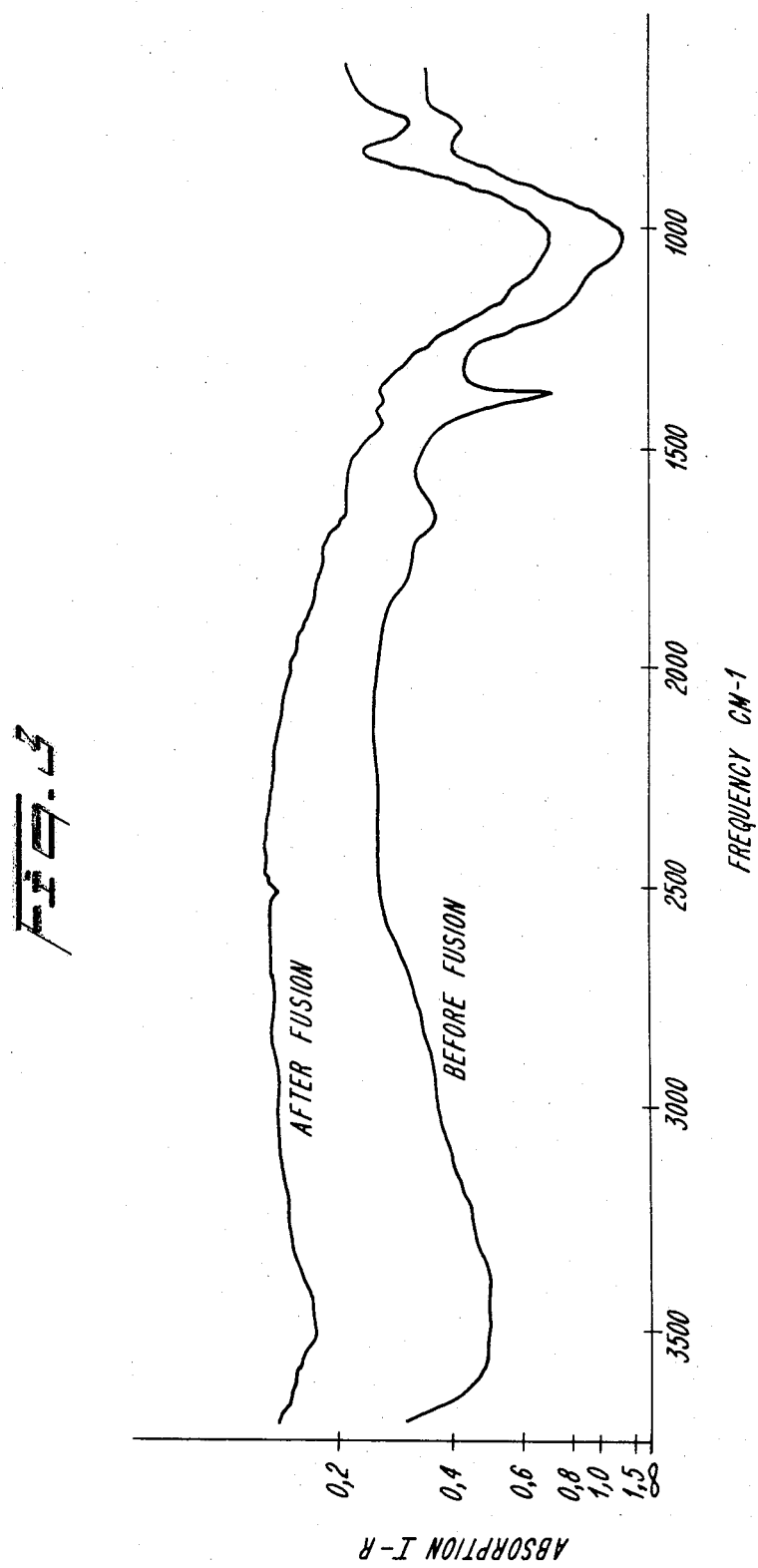

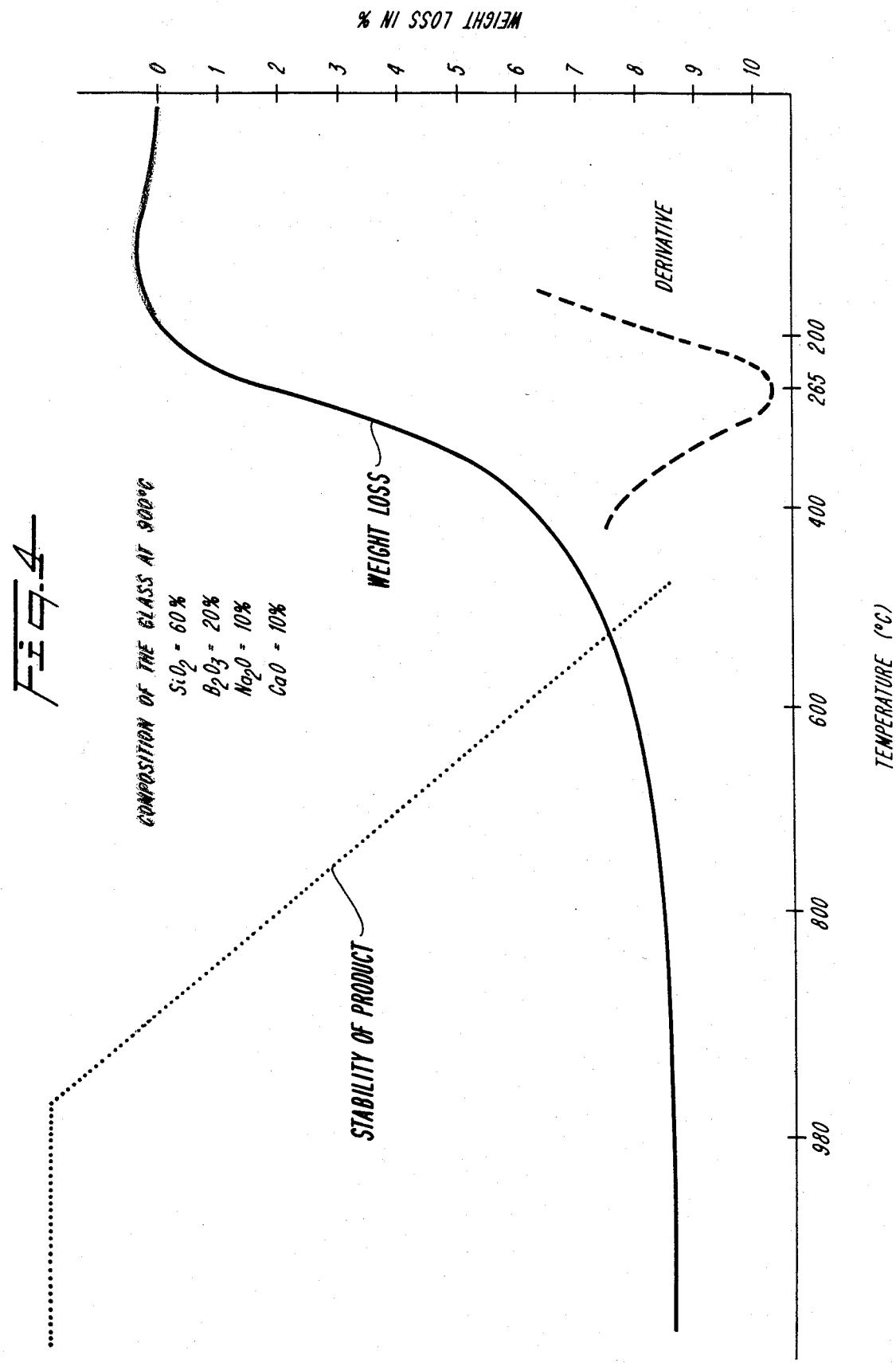

DOUBLE OR MIXED SILICATES OF ALKALI METAL AND OTHER GLASS MODIFIER METAL(S) USED TO PREPARE GLASS COMPOSITIONS

This application is a continuation-in-part of Ser. No. 281,913, filed July 9, 1981, now abandoned.

BACKGROUND OF THE INVENTION

1. Field of the Invention

The present invention relates to an improved process for the preparation of at least double metal silicates from solutions of alkali metal silicates. The invention also relates to the products of such process and the uses thereof, especially in the manufacture of glass.

2. Description of the Prior Art

It has long been known to this art to prepare precipitated silicas by the action (acidulation) of an acidification agent, such as an organic or inorganic acid, on a silicate. It is also known to prepare simple or double silicates by double decomposition.

However, a number of problems give rise to serious difficulties both in regard to the resultant product and in regard to the process itself. Of such difficulties, resultant purity, granulometry and density of the product, and ease of operation, selection of the materials used and energy savings with respect to the process, are representative, and not intended to be exhaustive.

Thus, in the case of glass making, for example, and although this is a method which has been carried out for a very long period of time, the compositions employed therefor are produced by melting the various ingredients, which, besides the ensuing problems as regards energy and operation due to the use of high temperatures over a prolonged operating period, gives rise to serious problems with respect to controlling the glass-making formulations, and in particular the homogeneity thereof.

And it has long been proposed, in British Patent Specification No. 512,292, to avoid the solid powder form of the constituents of the glass making admixture, but rather to precipitate same from solution, by means of suitable chemical process, in order to reduce the melting temperature and to achieve a reduction in the time required for melting.

Unfortunately, however, such a precipitation suffers a priori from the difficulties which ensue, on the one hand from elimination of by-products, and on the other from the necessity to evaporate large amounts of water.

In European Patent Application No. 80/400197.2, filed Feb. 8, 1980, and assigned to the assignee hereof, another process has been proposed which employs reactants in solution form, wherein, utilizing a solution of a soluble alkali metal silicate, at least partial substitution by at least one oxide of another metal is effected.

From a practical point of view, this process is conducted using solutions of sodium and/or potassium, and the attack operation is effected by means of a metal nitrate which can be produced by metal attack or dissolution of the metal oxide or hydroxide by nitric acid. This results in an amorphous and isotropic composition which is exceedingly interesting from a technical standpoint; nonetheless, the process suffers from the disadvantage of entailing preparation of the various metal silicates involved in the composition, thus likely giving rise to energy requirements which will not be inconsiderable.

Further compare, generally, U.S. Pat. No. 2,386,337; French Pat. Nos. 844,113, 853,480 and 2,011,819; and *Chemical Abstracts*, 53, 18418d (1959).

SUMMARY OF THE INVENTION

Accordingly, a major object of the present invention is the provision of an improved process for the preparation of at least double metal silicates, said process being devoid of those disadvantages and drawbacks to date characterizing the state of this art, and said process featuring interreacting an aqueous solution of an alkali metal silicate with a solution of an oxide of such at least one other metal, or salt thereof, in the presence of a water-miscible polar organic liquid to effect suspension of the at least double silicate in an insoluble and finely divided form.

BRIEF DESCRIPTION OF THE DRAWINGS

FIG. 3 is an infra-red absorption spectrum obtained according to the invention; and FIG. 4 is a thermogram of a composition containing $B_2O_3$ according to the invention.

DETAILED DESCRIPTION OF THE INVENTION

Figure 1:
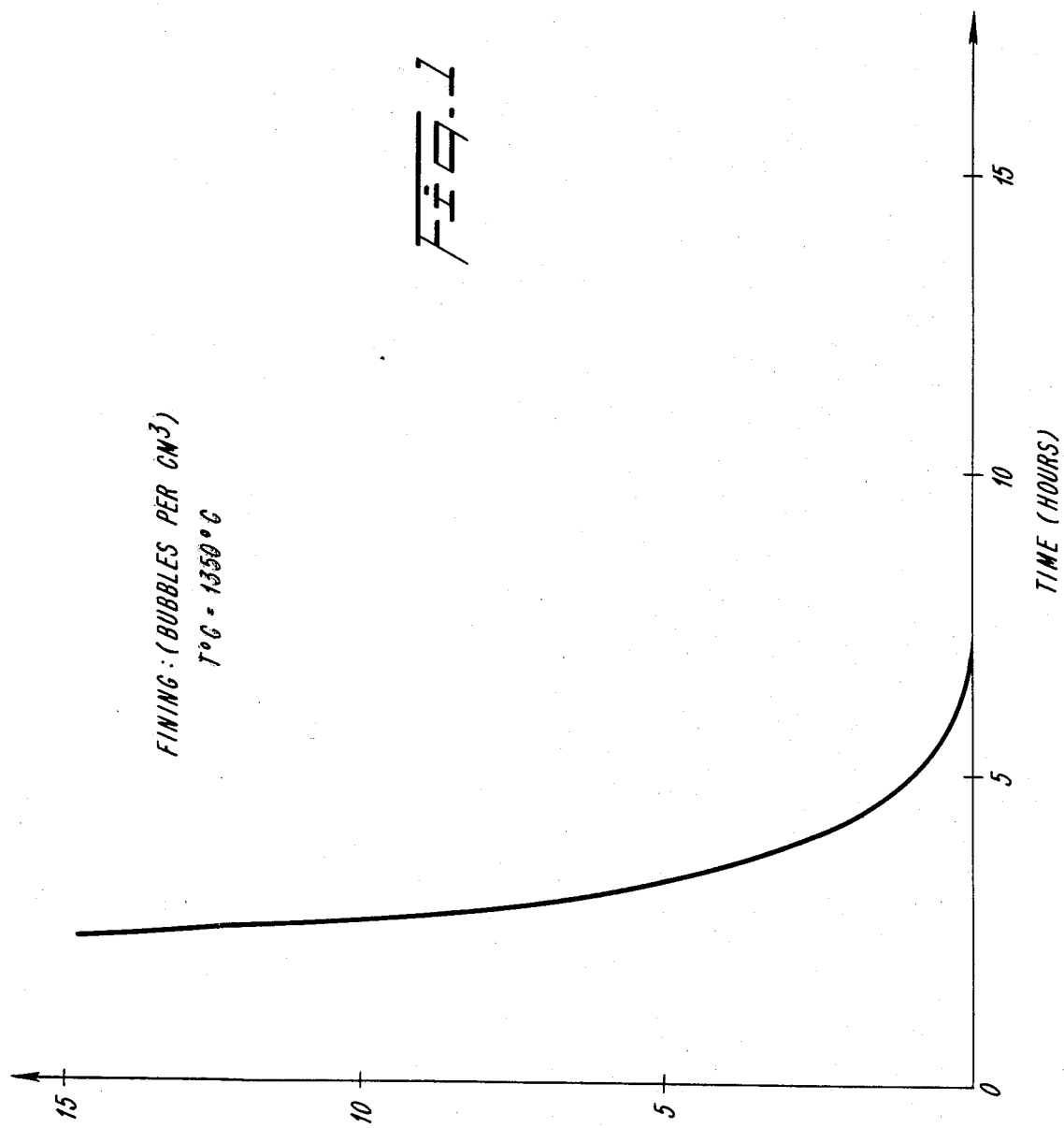
FIG. 1 is a graphical representation of a fining curve according to the invention, plotting bubbles per cubic centimeter versus time (hours), at 1350° C.

More particularly according to this invention, consistent with a first embodiment thereof, the organic liquid is added directly to the silicate solution; the resulting insoluble silicate may be separated simply, and optionally crushed.

In accordance with another embodiment of the invention, the organic liquid is first added to a solution of metal oxides and salts of metal oxides, such as to produce an organic solution, especially a methanolic solution, of said oxides and salts, the solution of alkali metal silicate(s) then being added to said organic solution.

It is then possible to effect rapid addition of the solution of silicate or silicates to the organic solution, e.g., a methanolic solution, of lead silicate, for example.

It too will be appreciated that it is envisaged to also use intermediate modes of operation, varying the nature of the base solutions and the amounts thereof.

In general, consistent herewith there is formed an alkaline solution containing silica and an acid solution of the oxides or salts of a group of glass modifying oxides: calcium, barium, zinc, etc., and said two solutions are interreacted in the presence of a miscible polar organic liquid which can be introduced either with one of the two solutions, or separately. In the case of glass-making compositions, the alkaline solution includes the glass forming oxides, silica, boron, alumina, etc., while the acid solution contains the other oxides, and in particular the glass modifying oxides.

According to this invention, it is possible to produce a very intimate composition of metal silicates, by effecting an exchange of a plurality of cations; from the point of view of the product, this results in a condition of homogeneity which is chemical and no longer simply physical in nature, while from the point of view of the process, it permits conducting the operation in a single stage, which involves savings both in regard to capital investment costs and operational costs.

The present invention is especially noteworthy when double, triple or higher silicates are to be prepared in a very simple manner, same displaying a high degree of homogeneity.

Moreover, it too should be noted that the impurities may be removed more easily than when using the prior art processes, by effecting their transfer into the aqueous phase, if necessary in the form of soluble complexes.

The aqueous solutions of silicates employed as starting material comprise, in particular, silicates of sodium and potassium. Such solutions may optionally contain adjuvants, such as specific complexing agents, such as to facilitate the removal of certain impurities, such as heavy metals, e.g., iron, such as "Tiron", namely, sodium 1,2-dihydroxybenzene-3,5-disulfonate, and also additives and adjuvants.

The water-miscible polar organic liquid may comprise an alcohol, preferably methyl alcohol.

As hereinbefore mentioned, when silica is to be produced, the aqueous solution of the alkali metal silicate, to which the methanol is added, is acidulated. The acidification agent may comprise a mineral or organic acid.

The mixture which is eutectic in behavior in accordance with the invention, may be produced in the following simple manner:

The molar ratio of the solution of alkali metal silicate, from which the metal silicates forming the mixture will be precipitated, is first determined.

The molar ratio referred to immediately above is:

$$Rm = \frac{\text{Molar concentration of the glass forming oxide } SiO_2}{\text{Total of molar concentrations of } K_2O, Na_2O, PbO, CaO, ZnO, \ldots}$$

When other glass forming oxides, such as $B_2O_3$, $P_2O_5$ or $Al_2O_3$, are present, there can be envisaged either the production of an alkaline solution: sodium borate, sodium phosphate or sodium aluminate, or the addition in acid form, in solution, of boric or phosphoric acid. The situation in regard to $Al_2O_3$ is different, its acid form not being soluble, and in that case it is foreseen to use water-soluble aluminum nitrate; the molar ratio calculation will be corrected in dependence upon the selected requirement for introducing such oxides.

The foregoing is then followed by preparation of the alkaline solution having the following ratio:

$$Rm = \frac{SiO_2}{Na_2O \text{ or } K_2O}$$

and the solution of the mixtures of oxides in an acid medium, for example, nitric acid.

The overall reaction scheme is as follows:

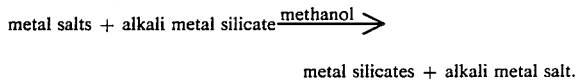

metal salts + alkali metal silicate $\xrightarrow{\text{methanol}}$ metal silicates + alkali metal salt.

This results in a suspension which merely has to be filtered. A solid cake is recovered from the filter, the solid being washed to remove the alkali metal salt which is in soluble form. It will be appreciated that the metal elements have been simultaneously combined in the form of silicates in the same molar ratio.

If the mixture comprises borates, phosphates or aluminates, metal borates, phosphates or aluminates which are generally insoluble in the mother liquor are formed in the same manner.

The aforesaid solids may be used as is in moist form, or may be dried or vitrified, depending upon the intended use thereof. For purposes of vitrifying same, the solids must be raised to a temperature which is slightly higher than the temperature at which same are irreversibly converted into glass.

There is no need for the salt of the substitution metal or metals to be present in excess, and it may even be present in deficient amounts, as the exchange reaction is total, which is a considerable advantage in the case of lead-based compositions, as the excess of lead required for the reaction is no longer to be found in the mother liquor, which makes it possible to achieve complete reaction efficiency, to eliminate the dangers of pollution, and to be able to easily recover the by-product, for example, alkali metal nitrate, in a high state of purity.

Typically, the reactants must be introduced in such manner as to give rise to the formulation of a very fine suspension of the silicate.

In accordance with a first embodiment of the invention, a base fraction is first formed with a silicate solution, the polar organic liquid is then added thereto, optionally followed by the aqueous solutions of acid and salts of the substitution metals.

The reactant concentration is limited only by the degree of saturation with respect to said reactants in the medium at a given temperature, which is preferably in the vicinity of ambient temperature.

Moreover, after separation, for example, by filtration of the solid and liquid phases, the polar liquid may be recycled.

Advantageously in this embodiment, the amount of methanol with respect to the starting material alkali metal is substantially equal to or greater than the amount of solids produced.

Another embodiment of the invention entails forming an organic solution, in particular a methanol solution, of the group of metal oxide(s) and the salts of said metal oxides, to which the solution of alkali metal silicate or silicates is added.

It has been determined that it is then possible to provide for the rapid addition of the solution of silicate, or silicates, into the organic solution, such as a methanolic solution, of lead nitrate, for example.

Moreover, from the point of view of industrial performance, it too has been found that less substantial agitation is sufficient, thereby decreasing energy requirements.

In this embodiment, it was also noted that it was possible to improve the homogeneity of the product and reduce the moisture content of the product, by carrying out the reaction with an excess of polar organic liquid with respect to the metal, advantageously an alkali metal (or the alkali metals), corresponding to an amount which is between one and a half and three times the amount of solids produced.

The present invention also features the composition produced by the process consistent therewith. It is known, in particular, that, in a conventional composition for making glass, the various constituents have a tendency to behave as if they were alone, the composition becoming homogeneous only at the moment of fusion which is effected at elevated temperature.

Now, the composition according to the invention occurs in homogeneous form and it is concluded that same is a perfect eutectic mixture, as may be determined from differential thermal analysis.

Moreover, the melting point is reduced in comparison with a conventional mixture. It is known that a serious problem in glass making is complete fusion of the grains of silica, which is achieved by adding a large amount of melting agents, in particular in the form of alkali metal derivatives. The subject process, though, makes it possible for the amounts of melting ingredients to be adjusted in a simple and entirely novel manner. It is sufficient to refer to the accompanying diagrams which reflect the desired melting temperature which is to be achieved, for a given composition.

Moreover, it is noted that the fining phase begins much earlier since the glass is already formed as soon as the melting temperature of the eutectic is reached. Accordingly, by adding a fining agent which decomposes at a temperature which is slightly higher than the melting temperature, it is found that large bubbles are rapidly formed, such bubbles being very easily removed; this phenomenon makes it possible to provide a much lower fining temperature, as the size of the bubbles is such that the operation of fining the glass may be effected at high levels of viscosity, that is to say, at lower temperatures.

The products according to the invention are suitable for a wide variety of uses.

As stated hereinbefore, in the glass-making industry, the subject compositions enable production of glasses of very high quality, homogeneous, free from impurities and of highly accurate composition. The production procedure is simplified, and requires much shorter preparation times than when the present-day method is used, thereby saving substantial amounts of energy.

Moreover, the subject mode of glass production permits wider use of natural raw materials.

Indeed, many modifier oxides exist in the natural state, but same are combined in widely varying proportions and, in particular, contain undesirable impurities. Simple treatments first involving hydrometallurgy and then purification or separation processes, make it possible to directly produce the solutions of said oxides, which are used in the subject process according to the invention.

In this case, the mode of operation for producing a quality glass is entirely novel. In particular, the proportions of oxides must be preliminarily determined depending upon the ore and the chemical treatments performed thereon, considering first all economic criteria. The basic properties of the glass, in particular those required for achieving quality and for the conversion operations, either manual or mechanical, namely: refractive index, color, working range or plateau, suitability for cutting and engraving or etching, should also be borne in mind.

Considering as exemplary the production of crystal containing more than 24% of PbO, the starting material selected must either be lead ore or lead concentrate which is produced after flotation. However, there are several ores of different qualities; therefore, in a first phase, it is necessary:

(i) to ascertain the appropriate hydrometallurgical treatment; and
(ii) to determine the precise composition of the solution resulting from the treatment.

Separation processes are then carried out to remove the undesirable oxides; typically, these are the colorant oxides $Fe_2O_3$, FeO, CuO, NiO, and the like. There results a solution which has a high content of PbO but which also contains other oxides such as ZnO, CaO, BaO, etc., which may play a favorable role in the production of the glass. This results in a composition which is appropriate to the ore evaluated. The economic attraction of the process is to use that solution directly. It is then sufficient to determine the proportion of the other oxides $SiO_2$, $B_2O_3$, $Na_2O$, $K_2O$, LiO in order to satisfy the desired properties in the crystal; this selection may be aided by the nature of the curve in respect of viscosity of the glass versus temperature.

With the final composition of the glass being fixed, it is sufficient:

(1) to produce the alkaline solutions in a good molar ratio;
(2) to take the purified solution resulting from the hydrometallurgical treatment, which may or may not have been modified, depending on circumstances; and
(3) to carry out that process above described.

For glasses comprising toxic substances such as lead, the vitrified product virtually eliminates any danger of pollution. Finally, it is envisaged to formulate novel glasses containing a lesser amount of the alkali metal elements.

[I] In the coverings or coatings industry based on mineral substances: ceramics, glass steels, etc., mixtures of this type permit novel production processes to be used, and the hydrated glass can combine chemically with the support and thus improve mechanical properties.

[II] In the industry of the silica-base mineral catalysts, it is possible to make use of one of the properties of the mixture of silicates, which can foam upon vitrification. In this way, it is possible to produce metal silicates having a high specific surface area. The foaming action is produced by the condensation reactions and by the elimination of air which is occluded at particular temperatures.

[III] In the glue industry, the aforementioned products may be used as a high-temperature binder. They may be used very profitably in the treatment of toxic mineral waste which can be easily and rapidly vitrified.

In order to further illustrate the present invention and the advantages thereof, the following specific examples are given, it being understood that same are intended only as illustrative and in nowise limitative.

EXAMPLE 1

Production of a sodium silicate in powder form having a molar ratio of 3.45

366 kg of sodium silicate in aqueous solution and containing 23.1% of $SiO_2$ and 6.9% of $Na_2O$ were placed in a 600 liter reaction vessel. 150 kg of methanol were added thereto at a temperature of 20° C., under agitation, and the resulting suspension was filtered; the suspension containing 18.4% of precipitated sodium silicate.

The following fractions were recovered:
(i) First, 356 kg of a mother liquor containing:
  (a) 221.3 kg of water;
  (b) 5.01 kg of dissolved sodium silicate; and
  (c) 130.0 kg of methanol; and
(ii) Second, 160 kg of a moist precipitate containing:
  (a) 104 kg of solid sodium silicate; and
  (b) 56 kg of mother liquor.

After washing, wet crushing and drying, about 110 kg of sodium silicate in powder form were recovered, the weight loss on ignition of which was about 5.4%. It was also possible to screen such product, with the rejected materials being recycled.

The mother liquor was treated to recover the methanol by distillation. The distillation bottoms were optionally recycled to the operation of dissolving the vitreous silicate.

EXAMPLE 2

The procedure of Example 1 was repeated; except that 500 g of Tiron were added to the beginning solution of sodium silicate. The iron which was present in the silicate solution remained dissolved in the mother liquor. In this manner, an iron-free silicate was produced, in a simple manner.

EXAMPLE 3

Production of powdered silica 366 kg of sodium silicate in aqueous solution and containing 23.1% of $SiO_2$ and 6.9% of $Na_2O$ were placed in a 600 liter reaction vessel. 150 kg of methanol were added thereto at a temperature of 20° C., under agitation. The suspension was then slowly neutralized by adding 51.3 kg of pure nitric acid thereto. The latter is optionally diluted to 30% or 60%.

The resultant product was a suspension comprising:
(i) 84.5 kg of precipitated silica;
(ii) 69.2 kg of soluble sodium nitrate;
(iii) 150.0 kg of methanol; and
(iv) 256.2 kg of water, or more if the acid was diluted.

Filtration, substantial washing and drying resulted in the silica being obtained in powder form, which had the following characteristics:

| | |
|---|---|
| (a) Ignition weight loss = | 6% |
| (b) $NaNO_3$ = | less than 100 ppm. |

Screening was optionally carried out, where necessary. The choice of acid was determined by the solubility of the salt in aqueous methanol. It was possible to effect neutralization with other organic or inorganic acids, nitrates having the advantage of being highly soluble.

The mother liquor was first treated by distillation to recover the methanol therefrom, and the salt was then crystallized in an evaporator.

EXAMPLE 4

Production of powdered calcium silicate in the molar ratio=3.45

183 kg of sodium silicate in aqueous solution and containing 23.1% of $SiO_2$ and 6.9% of $Na_2O$ were placed in a 600 liter reaction vessel. 75.0 kg of methanol were added thereto at a temperature of 20° C., under agitation, and 33.4 kg of $Ca(NO_3)_2$ in 30% solution were added.

This resultant product was a suspension comprising:
(i) 53.8 kg of solid calcium silicate;
(ii) 34.6 kg of soluble sodium nitrate;
(iii) 75.0 kg of methanol; and
(iv) 205.1 kg of water.

Filtration, washing and drying resulted in about 58 kg of calcium silicate powder.

As in the previous Example, the sodium nitrate was crystallized after partial distillation of the mother liquor.

EXAMPLE 5

Production of triple silicate of potassium, lead and calcium 200 kg of potassium silicate in aqueous solution and containing 21.2% of $SiO_2$ and 8.8% of $K_2O$ were placed in a 600 liter reaction vessel. 80 kg of methanol were added thereto at a temperature of 20° C., under agitation, and there was added thereto a solution of lead and calcium nitrate respectively containing:
(i) 19.4 kg of $Pb(NO_3)_2$;
(ii) 9.6 kg of $Ca(NO_3)_2$; and
(iii) 71.0 kg of water.

The resultant product was suspension comprising:
(i) 19.5 kg of solid potassium silicate;
(ii) 17.4 kg of solid calcium silicate;
(iii) 27.2 kg of solid lead silicate;
(iv) 0.5 kg of soluble potassium silicate;
(v) 23.7 kg of soluble potassium nitrate;
(vi) 211.0 kg of water; and
(vii) 80.0 kg of methanol.

After filtration, washing with aqueous methanol (26% of methanol) and drying, there was produced a homogeneous powder comprising a highly intimate admixture of the silicates of potassium, lead and calcium. Such powder was suspended in a liquid having a specific gravity of 3, which specific gravity was intermediate between, on the one hand, the potassium and calcium silicate, and, on the other hand, the lead silicate, and same did not separate by gravity; it remained entirely at the surface. It was also noted that said silicates displayed the same molar ratio.

The invention is not to be construed as being limited to the aforesaid five examples; it is equally applicable to other soluble silicates: lithium, potassium, sodium or quaternary ammonium silicate, and to other solutions of anionic or cationic metal salts: for example, barium nitrate, aluminum nitrate, calcium chloride, ferrous sulfate.

EXAMPLE 6

Production of a glass having the following composition

| | |
|---|---|
| $SiO_2$ = | 57% |
| $PbO$ = | 29.5% |
| $K_2O$ = | 12.1% |
| $Na_2O$ = | 2.0% |
| $Sb_2O_3$ = | 0.4% |

Based upon the foregoing composition, the characteristics of the solutions of alkali metal silicates to be used as the raw materials were determined. Moreover, a value of 1% of $K_2O$ was fixed as the amount of that element which was to be introduced in nitrate form for the fining operation. Therefore, there was employed a mixture of metal silicates, the molar ratio of which was:

$$Rm = \frac{\frac{57}{60.08}}{\frac{29.5}{223.19} + \frac{11.1}{94.2} + \frac{2}{61.98}} \approx 3.3$$

In this fashion there were prepared two solutions of alkali metal silicates, the first containing 20.3% of $SiO_2$ and 9.66% of K$_2$O, while the second contained 26.7% of SiO$_2$ and 8.33% of Na$_2$O.

The lead oxide in the process was introduced in the form of lead nitrate in solution, either by direct attack on the metallic lead by means of 15 to 25% dilute nitric acid, or by dissolving the oxide in nitric acid.

In order to produce 25 kg of glass, the glass forming operation was conducted in the following manner, at ambient temperature:

31.27 kg of a solution of lead nitrate containing 35% of salt were poured into a 200 liter reaction vessel provided with an agitator. 50 kg of methanol were added thereto. The mixture was agitated for a few minutes, and then 60.8 kg of the above-identified potassium silicate solution were poured therein; over a period of 60 minutes. Agitation was continued for another 2 hours, and the suspension was filtered. The following fractions were recovered:

(i) First, a wet cake which, after washing, comprised:
 (a) 21.5 kg of mixed potassium and lead silicate;
 (b) 0.54 kg of potassium nitrate; and
 (c) 22.0 kg of aqueous methanol; and
(ii) Second, a mother liquor and wash waters, namely:
 (a) 6.14 kg of potassium nitrate; and
 (b) 120 kg of aqueous methanol.

The filter cake was dried at a temperature of 200° C. in a drying oven; there were recovered 24 kg of product. The following mixture was then prepared in a malaxator:

(i) 24 kg of mixed potassium and lead silicate;
(ii) 0.1 kg of antimony oxide; and
(iii) 6.0 kg of the above-defined sodium silicate solution.

This mixture was then agglomerated by pressing in order to convert same into non-powdery form. The agglomerates were optionally dried in a drying oven at a temperature of 200° C.

The agglomerates were then introduced into a crucible which was maintained at a temperature of 1350° C. After 5 hours of fusion, the glass contained less than 1 bubble/cm$^3$, which evidenced the high speed of the fining operation. Two hours were then sufficient to produce a very fine and highly homogeneous glass.

Figure 2:
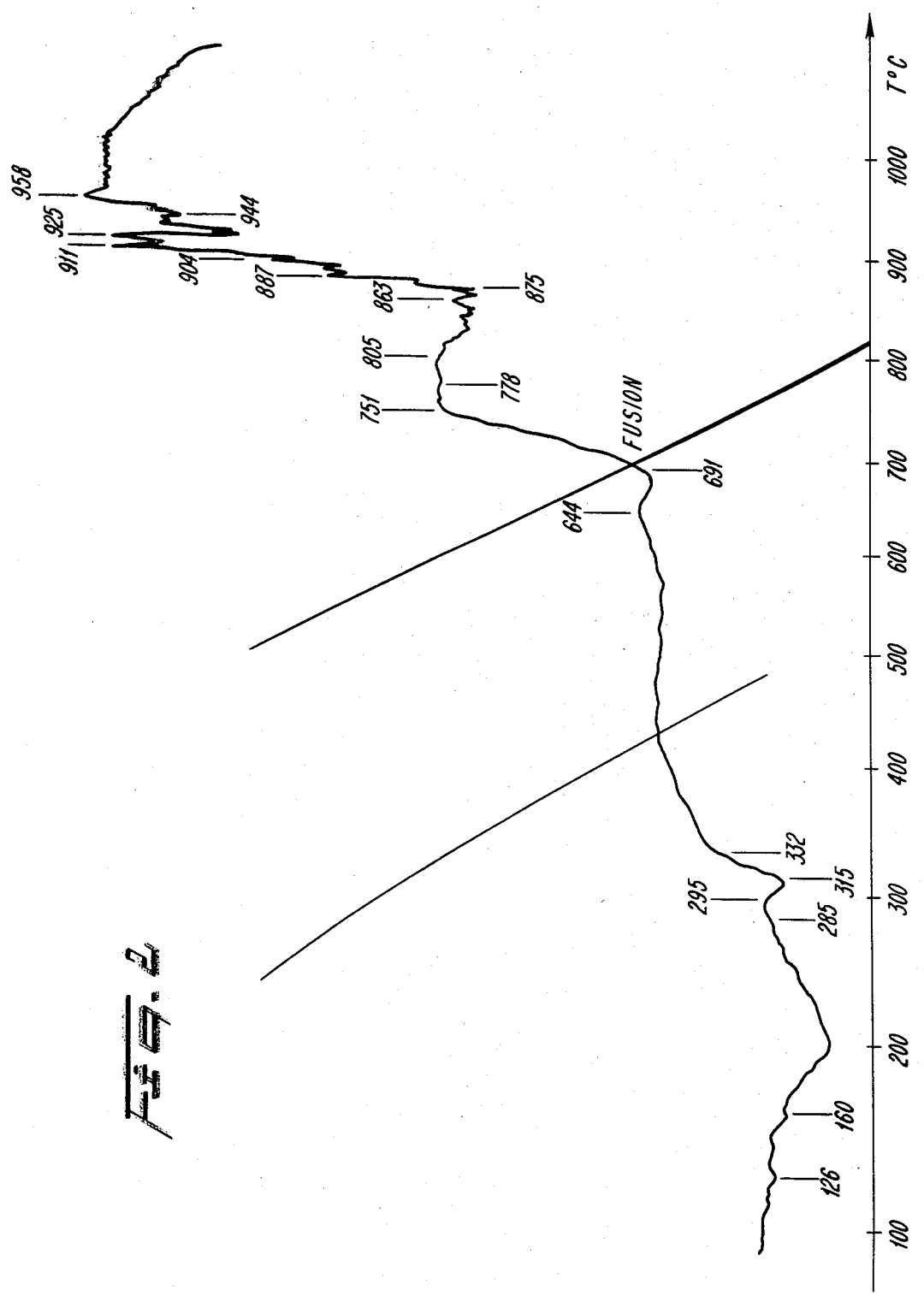
FIG. 2 is a graph of differential thermal analysis according to the invention.

In the accompanying Figures of Drawing:
(i) FIG. 1 illustrates the fining curve at 1350° C. which demonstrates the very short period of time for operations of this type;
(ii) FIG. 2 is a differential thermal analysis curve; and
(iii) FIG. 3 is an infra-red absorption curve.

Physical-chemical analyses of the powder before melting revealed specific properties. In particular, differential thermal analysis evidenced, besides the separation of water± combined, which was spread out between 20° C. and 500° C., that there occurred at about 700° C., a slightly endothermic transformation corresponding to complete vitrification of the powder. The infra-red spectrum produced from a pellet of KBr containing 2% of powder according to the invention clearly evidenced that, except for the presence of water and potassium nitrate, the structure thereof was close to that of glass. Likewise, chemical analysis of the amorphous mixture when raised to different temperatures for 12 hours evidenced the physical-chemical transformation. Indeed, by determining the solubility of the compound in nitric acid at 100° C. depending upon the drying or baking temperature, a substantial reduction was noted between 600° and 700° C.:

| Temperature | Percentage of PbO soluble in 10% HNO$_3$ (100° C.) | Percentage of K$_2$O soluble in 10% HNO$_3$ (100° C.) |
|---|---|---|
| 200° | 95% | 90% |
| 500° | 86% | 87% |
| 600° | 36% | 75% |
| 700° | 6% | 30% |
| 800° | 5% (I) | 29% (I) |

(I) These values were also those which were found after nitric acidulation of crushed glass (glass melted at 1300° C.).

EXAMPLE 7

The starting material was a concentrated sulfur or carbonate ore, primarily containing:
(i) 75% of PbO;
(ii) 3% of ZnO;
(iii) 2% of CaO;
(iv) 1% of MgO;
(v) 0.1% of CuO;
(vi) 0.1% of Fe$_2$O$_3$; and
(vii) +silica+insoluble materials+impurities in the form of trace amounts.

Nitric acidulation of that concentrate was effected. A very large proportion of the oxides was dissolved. An excess of acid was required by virtue of the inevitable reducing reactions between the sulfides which were typically present, and acid.

120 g of concentrate was introduced into 410 g of 20% dilute nitric acid, and, after filtration, a solution containing the following was recovered:
(i) 24% of lead nitrate;
(ii) 1.5% of zinc nitrate;
(iii) 1.3% of calcium nitrate;
(iv) 0.8% of magnesium nitrate; and
(v) +220 ppm of CuO and 220 ppm of Fe$_2$O$_3$.

The copper oxide was eliminated by electrolytic deposition on lead, and the iron oxide was eliminated by precipitation of the hydroxide with a pH value of 3.5.

Such technique, therefore, resulted in a solution which contained only non-coloring modifier oxides.

It is this solution which can be used in the process according to the invention for producing the desired glass.

As stated hereinbefore, the present invention also contemplates the presence of glass forming oxides such as B$_2$O$_3$.

EXAMPLE 8

Production of a glass having the following composition

| | |
|---|---|
| SiO$_2$ = | 60% |
| B$_2$O$_3$ = | 20% |
| Na$_2$O = | 10% |
| CaO = | 10% |

Based upon the foregoing composition, the characteristics of the solution of silicates to be used as raw material was determined. The molar ratio was determined by treating B$_2$O$_3$ as an adjuvant (or additive) as follows:

$$Rm = \frac{SiO_2}{Na_2O + CaO} = 3$$

The following three solutions were prepared:

(1) Sodium silicate containing 20% by weight of $SiO_2$ and 6.9% of $Na_2O$ (Rm=3);
(2) Calcium nitrate containing 50% of $Ca(NO_3)_2$;
(3) Boric acid containing 5% of $H_3BO_3$. Preferably, a hot solution is prepared at 90° C. containing 25% of acid.

These three solutions were used in two methods. In method (a), the three solutions were combined and then precipitated in the presence of methanol. In method (b), the sodium and calcium silicates were precipitated in the presence of methanol, filtered, and then the wet precipitate was mixed with boric acid solution, and finally dried.

Method (a) is more direct but does not provide a boron yield of 100%, hundreds of ppm of boron being found in the mother liquor. Method (b) results in the obtention of 100% of the boron in the composition.

Method (a)

58.5 g of calcium nitrate solution (2) and 142 g of boric acid solution (3) at 25% of acid were placed in a reaction vessel. 100 g of methanol were added thereto. The mixture was agitated for a few minutes, and then 300 g of sodium silicate solution (1) were poured therein. The resulting suspension was filtered, washed with 200 g of water, and then dried.

After drying, 105 to 110 g of product was obtained containing 19% of boron, instead of 20%. However, this slight loss of boron can be avoided by adding a slight excess of boric acid when precipitating the silicates.

Method (b)

58.5 g of calcium nitrate solution (2) were placed in a reaction vessel. 100 g of methanol were added thereto under agitation, and 300 g of sodium silicate solution (1) were added.

The resulting suspension was filtered and washed, and then the wet precipitate was mixed with 142 g of boric acid solution (3). The resultant product was dried to obtain 105 to 110 g of powder.

The behavior of the product is the same whether obtained by method (a) or method (b) as shown by the thermogram of FIG. 4, namely:
(i) from 20° C. to 600° C.—dehydration of the product;
(ii) from 600° C. to 700° C.—melting of the particles (or pellets); and
(iii) from 700° C. to 900° C.—no loss in weight with the beginning of fining.

In particular, the stability of the product at elevated temperature should be noted.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the preparation of an at least double silicate of an alkali metal and at least one other metal, said process comprising interreacting:
(i) an aqueous solution an alkali metal silicate which is alkaline and comprises a glass forming oxide and
(ii) a solution of an oxide of such at least one other metal, or salt thereof, which is acidic and comprises a glass modifying oxide,
the improvement which comprises effecting said interreacting directly and rapidly with agitation in the presence of
(iii) a water-miscible polar organic liquid, whereby said at least double silicate is suspended in the organic reaction medium in insoluble and finely divided form.

2. The process as defined by claim 1, said water-miscible polar organic liquid (iii) being first added to the solution (ii), and then the solution (i) being added thereto.

3. The process as defined by claim 2, said liquid (iii) comprising methanol.

4. The process as defined by claim 1, said solution (i) further comprising $B_2O_3$, $P_2O_5$ or $Al_2O_3$.

5. The process as defined by claim 1, said solution (ii) further comprising boric acid, phosphoric acid, or aluminum nitrate.

6. The process as defined by claim 1, said at least double silicate being filtered, and then mixed with boric acid, phosphoric acid or aluminum nitrate.

7. The process as defined by claim 1, the alkali metal silicate which comprises the solution (i) comprising a sodium or potassium silicate.

8. The process as defined by claim 1, said water-miscible polar organic liquid (iii) comprising an alcohol.

9. The process as defined by claim 1, said solution (ii) comprising a nitric acid solution.

10. The process as defined by claim 1, the polar organic liquid (iii) being added to the silicate solution (i), and an aqueous acid solution (ii) of salt of said at least one other metal being added thereto.

11. The process as defined by claim 1, said solution (i) being added to a methanolic solution of said oxide of such at least one other metal, or salt thereof.

12. The process as defined by claim 1, wherein the source of at least one of the oxides comprises a natural mineral.

13. The product of the process as defined by claim 1, low temperature eutectic in behavior and rapidly fused and fined.

14. A glass comprising the product as defined by claim 13.

15. The process according to claim 1, wherein the molar ratio of the solution of alkali metal silicate from which the metal silicates forming the mixture will be precipitated is first determined:

$$Rm = \frac{\text{Molar concentration of the glass forming oxide } SiO_2}{\text{Total molar concentration of } K_2O, Na_2O, PbO, CaO \text{ and } ZnO,}$$

which is then followed by preparation of the alkaline solution having the molar ratio $$Rm = \frac{SiO_2}{Na_2O \text{ or } K_2O}.$$

* * * * *